United States Patent [19]

Smith

[11] Patent Number: 5,028,086
[45] Date of Patent: Jul. 2, 1991

[54] VEHICLE THEFT PREVENTING SEAT CUSHION FRAME

[76] Inventor: Alvin H. Smith, 10720 Lakewood Blvd., #209, Downey, Calif. 90241

[21] Appl. No.: 615,464

[22] Filed: Nov. 19, 1990

[51] Int. Cl.$^5$ ............................................. B60R 25/02
[52] U.S. Cl. ..................... 296/1.1; 296/65.1; 180/287; 297/378; 70/261
[58] Field of Search ................. 296/1.1, 65.1, 69; 180/287; 297/219, 354, 378, 379; 248/551, 552; 70/261

[56] References Cited

U.S. PATENT DOCUMENTS

| | | | |
|---|---|---|---|
| 1,421,726 | 7/1922 | Saunders | 70/261 |
| 3,278,226 | 10/1966 | Magnusson | 297/219 |
| 4,116,297 | 9/1978 | Ross et al. | 180/287 |
| 4,383,712 | 5/1983 | Kaganas | 297/219 |
| 4,458,738 | 7/1984 | Wilson | 297/219 X |
| 4,660,878 | 4/1987 | Neverson | 296/1.1 |
| 4,699,238 | 10/1987 | Tamir | 180/287 |
| 4,804,225 | 2/1989 | Fourrey et al. | 297/354 X |
| 4,982,810 | 1/1991 | Toy | 180/287 |

FOREIGN PATENT DOCUMENTS

| | | | |
|---|---|---|---|
| 2908611 | 10/1980 | Fed. Rep. of Germany | 70/261 |
| 2587663 | 3/1987 | France | 180/287 |
| 1127524 | 9/1968 | United Kingdom | 180/287 |
| 2102363 | 2/1983 | United Kingdom | 70/261 |

Primary Examiner—Margaret A. Focarino
Assistant Examiner—Joseph D. Pape
Attorney, Agent, or Firm—Edgar W. Averill, Jr.

[57] ABSTRACT

A vehicle theft preventing seat cushion frame. The seat cushion frame has a seat section made from a hardened material in a generally rectangular shape. The back section is hingedly connected to the seat section, and a telescoping member may be affixed between the front of the seat section and the top of the back section to form an impediment when affixed to the front seat of an automobile to the theft of that automobile. It can also be connected through the steering wheel of the vehicle to further deter theft.

6 Claims, 2 Drawing Sheets

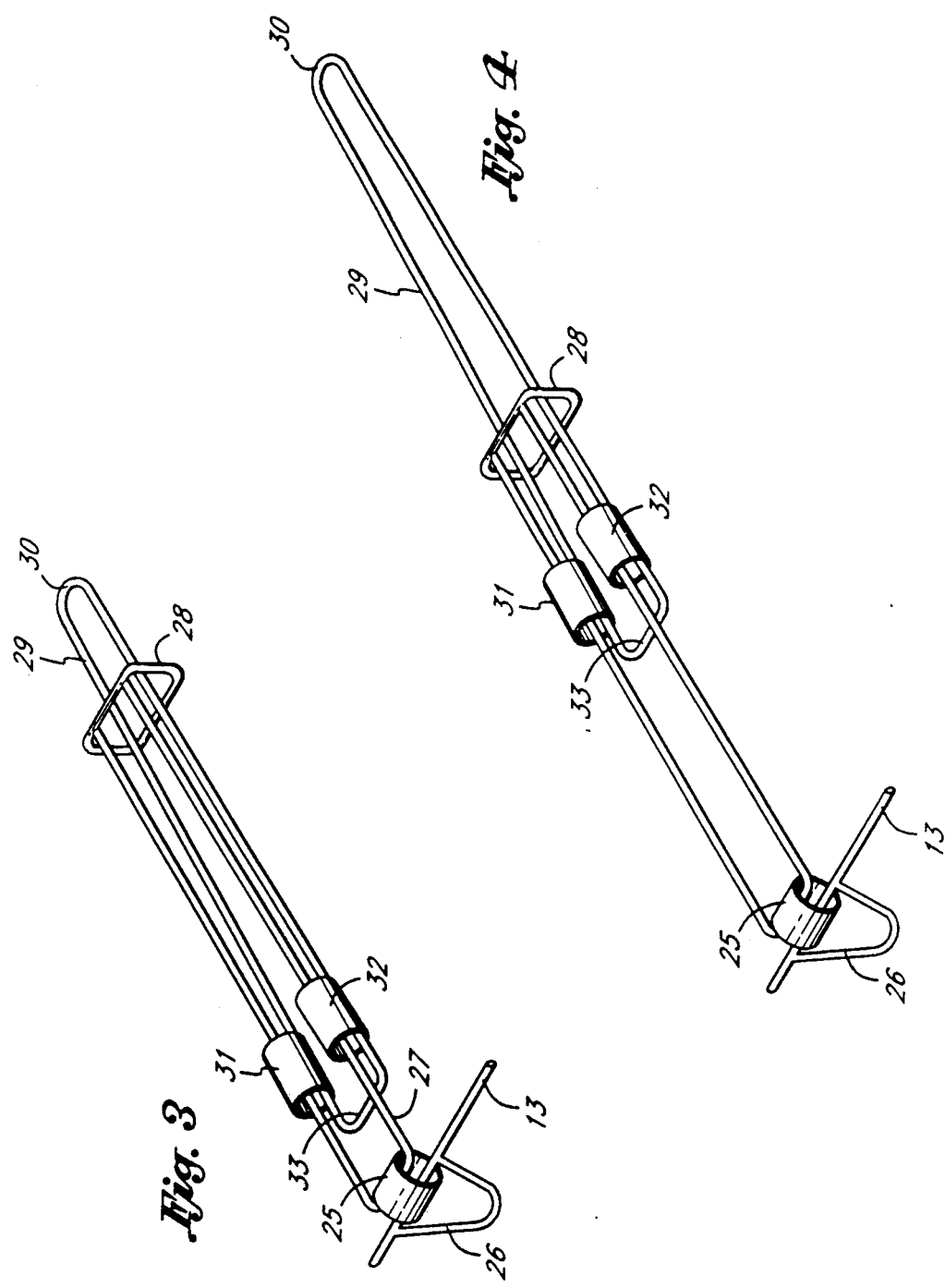

VEHICLE THEFT PREVENTING SEAT CUSHION FRAME

BACKGROUND OF THE INVENTION

The field of the invention is theft preventing devices, and the invention relates more particularly to devices which may be locked in the driver's seat to impede or prevent sitting in the vehicle or turning its front wheels. One commonly used device is a steel rod which locks to the steering wheel of a vehicle and makes it impossible to steer the vehicle without removing the device. This device, however, must be stored in the vehicle and is bothersome to affix.

Other devices have attempted to discourage theft by utilizing the driver's seat, and one such approach is shown in U.S. Pat. No. 4,116,297. Such device, however, requires that the seat be of the type which tilts forward thus not being practical in four-wheel cars. It also requires substantial modification of the seat.

SUMMARY OF THE INVENTION

It is an object of the present invention to provide a vehicle theft preventing device which is unobtrusive and useful in its own right and yet which may be utilized to prevent or at least discourage vehicle theft.

The present invention is for a vehicle theft preventing seat cushion frame comprising a seat section frame fabricated from a hardened material, the seat section frame having a front, a right side, a left side and a back. A back section frame is also fabricated from a hardened material, and the back section frame has a bottom, a right side, a left side and a top. The back section frame is hingedly connected to the back of the seat section frame along the bottom of the back section frame. A telescoping member has a hinged end and a free end and is affixed at its hinged end to either the front of the seat section or the top of the back section. The free end of the telescoping member may be locked between the front of the seat section and the top of the back section to hold the back section in a downwardly inclined position. The telescoping member may also be locked through the vehicle steering wheel to further discourage theft.

BRIEF DESCRIPTION OF THE DRAWINGS

FIG. 3 is an enlarged perspective view of the telescoping section of the vehicle theft preventing seat cushion frame of FIG. 1.

FIG. 4 is a perspective view of the telescoping member of the vehicle theft preventing seat cushion frame of FIG. 1.

DESCRIPTION OF THE PREFERRED EMBODIMENTS

Figure 1:
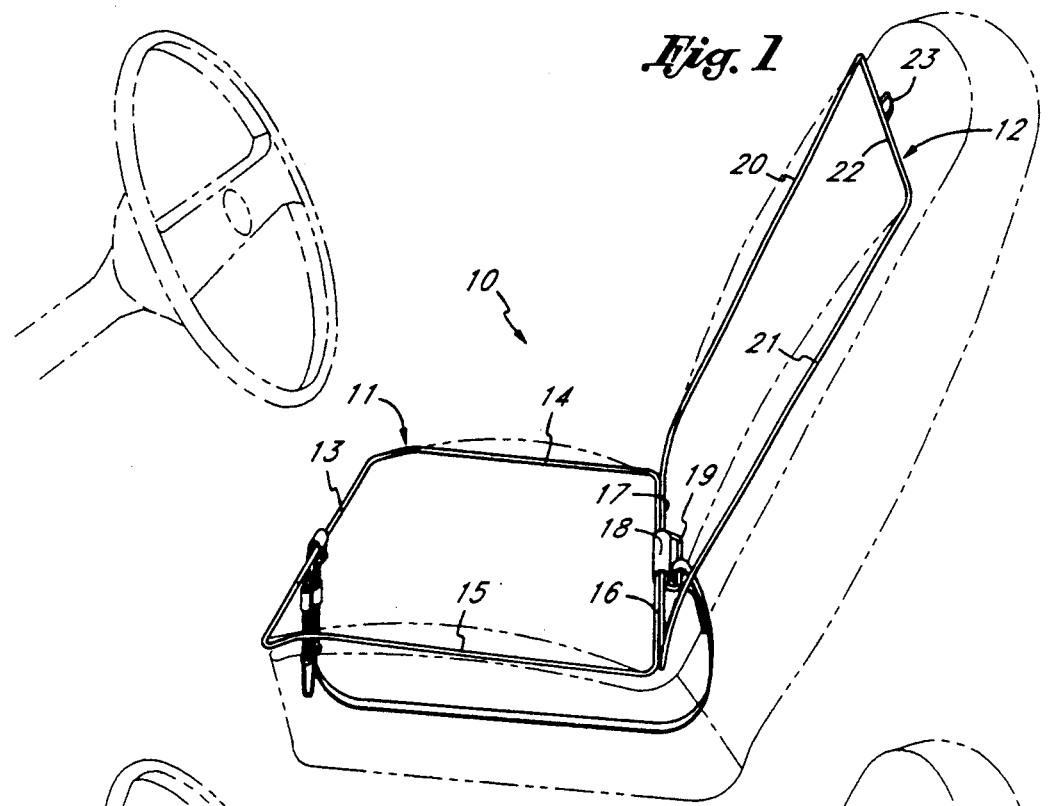
FIG. 1 is a perspective view of the vehicle theft preventing seat cushion frame shown on the driver's side of a vehicle including a seat and steering wheel shown in phantom view wherein the frame is in an unlocked position.

The vehicle theft preventing seat cushion frame of the present invention is show in perspective view in FIG. 1 and indicated generally by reference character 10. Seat cushion frame 10 has a seat section 11 and a back section 12. Seat section 11 has a front 13, a right side 14, a left side 15 and a back 16. Both the seat section and the back section are fabricated from a "hardened material" which is intended to mean a substance such as hardened steel or stainless steel which is difficult to cut through or break without using an extended length of time which would be potentially risky for an automobile thief. It is possible that some types of reinforced plastic o cable would be satisfactory with the main requirement being that it be stiff enough to form a frame and tough enough to be difficult to cut.

Figure 2:
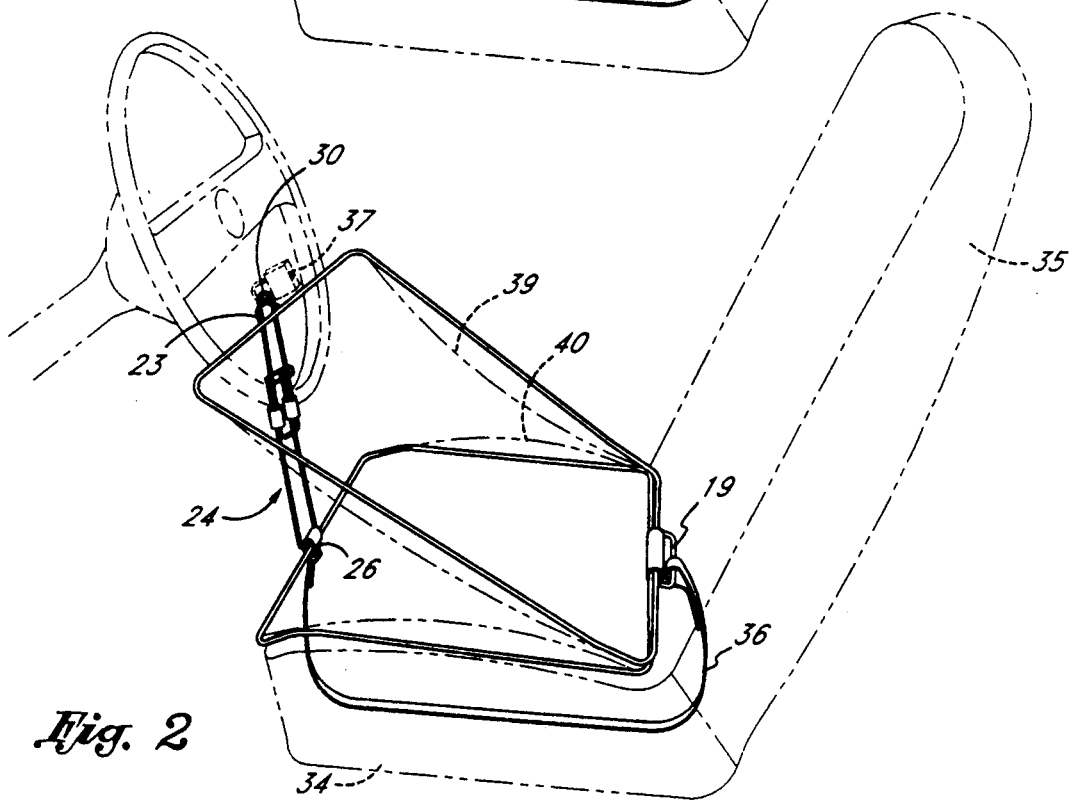
FIG. 2 is a perspective view of the vehicle theft preventing seat cushion frame of FIG. 1 in a locked configuration.

Back section 12 has a bottom 17 which is affixed to back 16 of seat section 11 by hinge means 18 which comprises a short length of tubing which surrounds both the bottom section and the back section. The tubing is welded to the back 16 and is captured in a loop 19 which is welded to bottom 17. This also preVents the lateral movement of the back section with respect to the seat section. Of course, other hinge means could also be used. Back section 12 has a right side 20, a left side 21 and a top 22. A loop 23 is welded to top 22 at the center thereof which facilitates locking the telescoping member thereto as shown best in FIG. 2.

A telescope section indicated generally by reference character 24 is shown in detail in FIGS. 3 and 4. The particular construction of the telescoping section is optional, and other construction can be used with the main concern being that of being difficult to cut or break. Telescoping section 44 is held to front 13 by ring 25 which is captured in a loop 26 welded to front 13. Ring 25 also captures an elongated U-shaped bar 27 which is welded at its external end to a rectangular loop 28. An elongated loop 29 has a free end 30 which extends past rectangular loop 28 and is held to elongated U-shaped bar 27 by a pair of rings 31 and 32 which are welded to elongated loop 29 near its inner end 33. As shown in FIG. 4, the free end 30 may be moved outwardly and is limited in its outward movement when rings 31 and 32 abut rectangular loop 28.

Returning now to FIG. 2, the seat section 11 is secured to the bottom 34 of the automobile seat, which is shown in phantom view, where the back is indicated by reference character 35. A steel strap 36 is secured to loop 19 at the back of automobile seat bottom 34 and secured to loop 26 at its other end. This prevents the frame from being removed from the seat. Next, the back section 12 is moved forwardly, and telescoping section 24 is moved upwardly and extended so that its free end 30 passes through loop 23 along top 22. A padlock 37 may then be passed through free end 30 to hold the unit in place until unlocked. A cushion 39 may be sewn, or otherwise affixed, to the back section, and a seat cushion 40 may be sewn, or otherwise affixed, to seat section 11. Thus, the device can add further comfort as well as security to the vehicle.

While the device is shown affixed to the driver's side of a vehicle, it could also be beneficial when affixed to the passenger side to help discourage the theft of a radio, tape deck or other electronic device. Its presence would make it very difficult for a thief to disconnect such electronic device.

It is further possible that the device can be used in the passenger side without the securing strap such as steel strap 36. The mere connection of the device to the steering wheel is sufficiently obstructing to discourage most theft.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A vehicle theft preventing seat cushion frame comprising:
    a seat section frame fabricated from a hardened material, said seat section frame having a front, a right side, a left side and a back;
    a back section frame also fabricated from a hardened material, said back section frame having a bottom, a right side, a left side and a top, said back section frame being hingedly connected to the back of the seat section frame along the bottom of the back section frame;
    a telescoping member having a hinged end and a free end, said telescoping member being affixed at its hinged end to the front of the seat section, said telescoping member having connecting means at its free end so that it may be locked to the top of the back section; and
    means for securing said seat section to a vehicle seat whereby the vehicle may be secured from theft by securing the seat section to the vehicle front seat, tilting the back section forwardly and locking the telescoping member to the top of the back section frame.

2. The vehicle theft preventing seat cushion frame of claim 1 secured to the driver's side of a vehicle having a steering wheel wherein the telescoping member is passed through a portion of the steering wheel.

3. The vehicle theft preventing seat cushion frame of claim 1 wherein said seat section and back sections are fabricated from hardened steel rod.

4. The vehicle theft preventing seat cushion frame of claim 1 wherein said top of said back section includes a closed loop at the center thereof, and the free end of said telescoping section includes a loop which connects with the closed loop of the back section so that a padlock may secure the free end of the telescoping section to the top of the back section.

5. The vehicle theft preventing seat cushion frame of claim 1 further including a loop at the back and front of the seat section frame to facilitate securing the seat section to the vehicle seat.

6. A vehicle theft preventing seat cushion frame comprising for use on the driver's side of a vehicle having a steering wheel:
    a seat section frame fabricated from a hardened material, said seat section frame having a front, a right side, a left side and a back;
    a back section frame also fabricated from a hardened material, said back section frame having a bottom, a right side, a left side and a top, said back section frame being hingedly connected to the back of the seat section frame along the bottom of the back section frame; and
    a telescoping member having a hinged end and a free end, said telescoping member being affixed at its hinged end to the front of the seat section, said telescoping member having connecting means at its free end so that it may be locked to the top of the back section through the steering wheel of the vehicle thereby preventing the driving of the vehicle without first removing the device.

* * * * *